Inventor:
RAYMOND E. ZENNER
by The Firm of Charles W. Hills Attys.

April 13, 1954

R. E. ZENNER 2,675,185

WINDING AND REELING MECHANISM

Filed May 13, 1947

3 Sheets-Sheet 2

Inventor
RAYMOND E. ZENNER by The Firm of Charles W. Hills Attys.

April 13, 1954 R. E. ZENNER 2,675,185

WINDING AND REELING MECHANISM

Filed May 13, 1947

3 Sheets-Sheet 3

Inventor

RAYMOND E. ZENNER by The Firm of Charles W. Hills Attys.

Patented Apr. 13, 1954

2,675,185

UNITED STATES PATENT OFFICE 2,675,185

WINDING AND REELING MECHANISM

Raymond E. Zenner, Brookfield, Ill., assignor to Armour Research Foundation of Illinois Institute of Technology, Chicago, Ill., a corporation of Illinois Application May 13, 1947, Serial No. 747,638

4 Claims. (Cl. 242—54)

My invention relates to winding and reeling mechanisms such as are used in connection with magnetic recording equipments and the like to transfer a medium from one storage device to another.

In the recording of an intelligence on a lengthy medium such as magnetizable wire or tape, the medium is passed over a head which varies the condition of an incremental length of the medium, such as the magnetization thereof, in accordance with the time variations of the intelligence, thereby imparting to the medium variations along its length in accord with the intelligence. In reproduction, the medium is again passed over a head in the same direction and the condition of the medium along an incremental length thereover is reproduced as a signal, such as sound, thereby converting the variations of the medium along its length to a time varying signal corresponding to the recorded intelligence.

Inasmuch as the time variations of the recorded and reproduced signals correspond with the variations of the medium along its length, it is necessary in such recording and reproducing equipment to provide a winding and reeling mechanism capable of causing the medium to travel across the head at a predetermined constant velocity. Moreover, it is highly desirable that this mechanism be capable of rewinding the medium after recording or reproduction to enable the medium to be restored to a condition on the storage devices or spools wherein the intelligence may be reproduced again. It is accordingly a general object of the present invention to provide an improved winding and reeling mechanism capable of drawing a lengthy medium across a head at constant velocity and which is selectively operable to rewind the medium.

A further object of this invention is to provide an improved winding and reeling mechanism wherein the tension applied to the medium transferred is maintained at a predetermined value sufficient to prevent entangling but insufficient to cause undue breakage.

Still another object of this invention is to provide an improved winding and reeling mechanism wherein the medium may be transferred in one direction at one predetermined velocity and in the opposite direction at another predetermined velocity.

An additional object of the present invention is to provide an improved directional driving and retarding system for use in a winding and reeling mechanism.

It is still another object of this invention to provide an improved drive capable of causing travel of a lengthy medium in either direction but which may utilize a unidirectional drive motor.

Yet another object of the present invention is to provide an improved drive mechanism to cause travel of a lengthy medium in either of two directions at predetermined unequal velocities and which may be driven by a constant speed driving motor capable of rotating in only one direction.

Further, it is an object of the present invention to provide an improved directional slip clutch and brake for use in reversible winding and reeling mechanisms.

My invention further resides in features of construction, combination, and arrangement, wherein a simple and effective winding and reeling mechanism is provided, which mechanism is simple in construction and reliable in operation and may be manufactured from readily available materials.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings.

Figure 1:
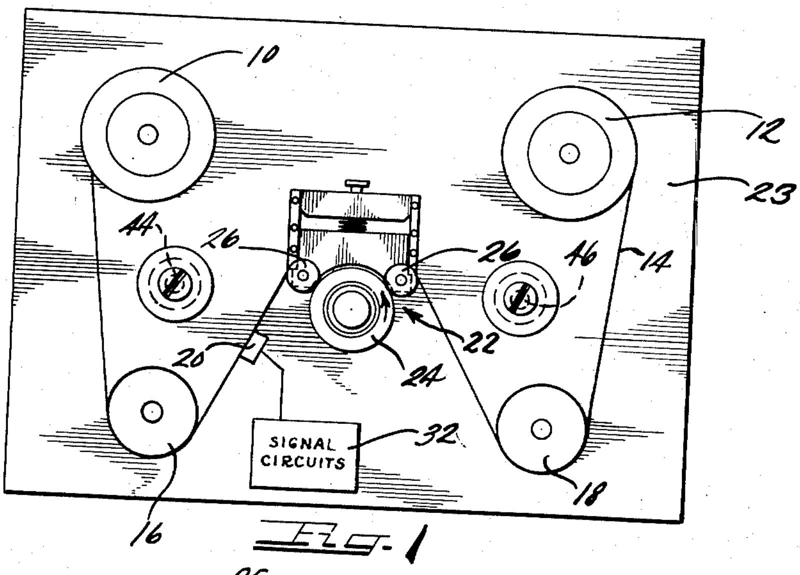
Figure 1 is a top plan view of an embodiment of my invention showing medium storage devices, a capstan, and a lengthy medium wound thereon.
Figures 8, 9, 10:
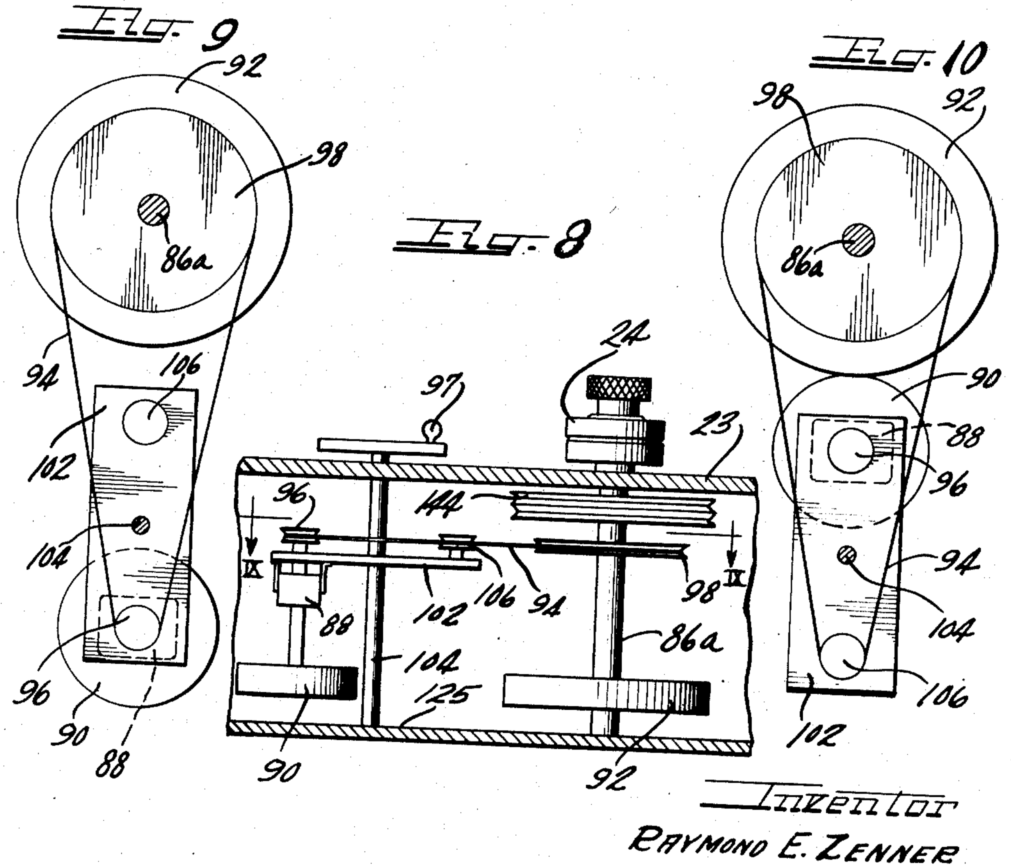
Figure 8 is a fragmentary side view like Figure 5 but showing an alternative drive suitable for use with a single speed unidirectional drive motor.
Figure 9 is a cross-sectional view through the axis IX—IX, Figure 8.
Figure 10 is a view like Figure 9 but showing the mechanism adjusted to drive the medium in the opposite direction.

In Figure 1, 10 and 12 represent medium supporting devices, such as spools, upon which medium 14 is wound so as to be transferable therebetween by appropriate rotation thereof. In transferring between spool 10 and spool 12, medium 14 passes over guide pulleys 16 and 18 as well as recording and reproducing head 20 and the capstan mechanism shown generally at 22.

It is the function of the capstan mechanism, shown generally at 22, to impart to medium 14 a predetermined linear velocity determined by the angular velocity of capstan wheel 24. This wheel is constructed of rubber or similar material which, when acted upon by pressure rolls 26, grips medium 14 to prevent slippage thereof relative to the wheel 26. Thus by maintaining constant the angular velocity of motor 30, a constant linear velocity is imparted to medium 14.

In the application of this invention to a magnetic recorder or reproducer, the medium 14 is passed over a head 20 which is electrically connected to signal circuits 32. In the recording operation, an intelligence, such as sound, is converted in signal circuit 32 to a time varying electromotive force which, when impressed on head 20, produces a time varying magnetic field therein. The time varying magnetic field magnetizes each incremental length of medium 14 as it passes over head 20, thereby imparting a longitudinally varying degree of magnetization along the medium 14 in accord with the intelligence. Conversely, in the reproducing operation, the passage of medium 14 over head 20 induces a time varying electromotive force therein corresponding to the longitudinal variations in magnetization of the medium, which time varying electromotive force is amplified and reproduced as sound by signal circuits 32.

Figure 3:
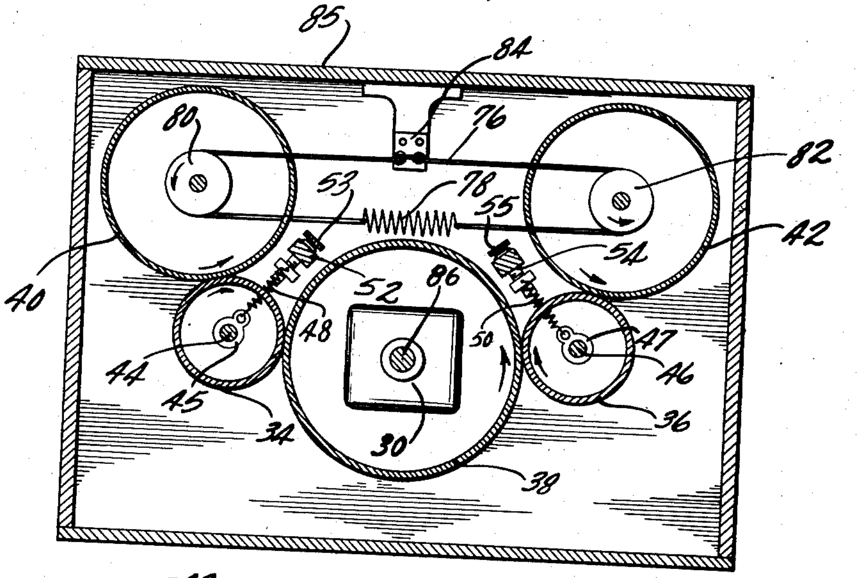
Figure 3 is a cross-sectional view through axis III—III, Fig. 2, and showing the co-operating elements of the drive mechanism of that figure.
Figure 2:
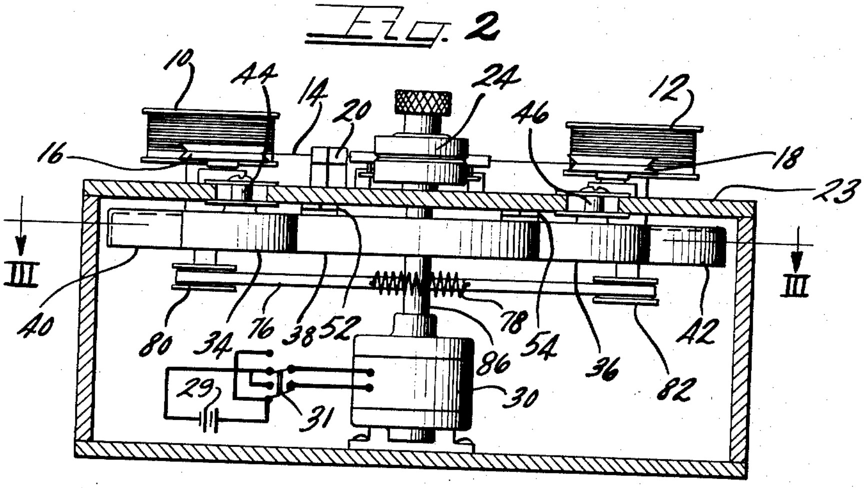
Figure 2 is a side elevational view of an embodiment of my invention showing the reversible drive mechanism and the associated mechanism.

It is the purpose of idler wheels 34 and 36, Figure 2, together with driving wheel 38 and driven wheels 40 and 42, to drive spools 10 and 12 in the take-up direction to wind medium 14 thereon. To this end, idler wheels 34 and 36 are mounted upon shafts 44 and 46 which are spring biased in direction to wedge wheels 34 and 36 between wheels 40 and 38, and wheels 42 and 38, respectively. The biasing action for this purpose is derived from springs 48 and 50, Figure 3, which are each anchored at one end to shafts 44 and 46, respectively, by washers 45 and 47, and on the other end to supports 52 and 54, respectively. Supports 52 and 54 are attached to top panel 23 as will be evident from Figure 2. Screws 53 and 55, Figure 3, are provided to adjust the tension of springs 48 and 50.

Figures 4, 4A:
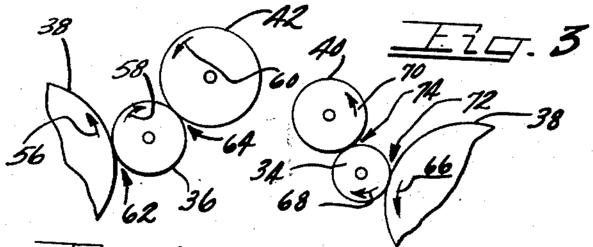
Figures 4 and 4A are diagrammatic views illustrating the operation of the drive means of the embodiment of my invention shown in Figures 2 and 3.

The operation of idler wheels 34 and 36 as a directional drive may best be understood from Figures 4 and 4A which show the forces acting thereon when medium 14 is in the process of being wound on spool 12, Figure 1. In Figure 4 the direction of motion of wheels 38, 36 and 42 is indicated by arrows 56, 58 and 60, respectively. These correspond to the direction of travel indicated by the arrows of Figure 3. Since wheel 38 acts as a drive wheel, force of direction shown by arrow 62 is exerted thereby on wheel 36. Similarly, since wheel 42 acts as a driven wheel by reason of the frictional losses therein, together with the tension of medium 14, this wheel causes a retarding force to be exerted on wheel 36, this force having the direction as indicated by arrow 64, Figure 4. Since the forces 62 and 64 both have substantial components in direction tending to support or add to the bias of spring 50, wheel 36 tends to be wedged between wheels 38 and 42, by reason of the drive action. Hence a relatively great frictional engagement exists between wheel 38 and wheel 42 and relatively large torque is exerted on the latter wheel by the former.

The operation of wheel 34 when medium 14 is being wound on device 12 will be evident from Figure 4A. In this figure, arrows 66, 68 and 70 indicate the directions of rotation of wheels 38, 34 and 40, respectively. Since wheel 38 is a driving wheel, force of direction shown in arrow 72 is applied to wheel 34 by the action of wheel 38. Moreover, since wheel 40 is a driven wheel, force having direction indicated by arrow 74 is imparted to wheel 34 by the action of wheel 40. It will be evident that forces in direction of arrows 72 and 74 have substantial components in direction opposite to the tensioning action of spring 48, Figure 3, and oppose the action of that spring in wedging wheel 34 between wheels 38 and 40. Accordingly, the frictional engagement between wheels 34 and 38, together with the frictional engagement between wheels 34 and 40, is smaller in amount than would exist in the absence of retarding torque on wheel 40. For this reason, the torque actually exerted on wheel 40 is smaller in amount than would be associated with rotation in the opposite direction.

When the direction of rotation of capstan wheel 24 and wheel 38 is reversed, the effects above described are likewise reversed and wheel 34 produces more torque on wheel 40 and wheel 36 produces less torque on wheel 42, thereby causing increased winding torque on spool 10 and decreased winding torque on spool 12.

It is the function of belt 76, spring 78, and pulleys 80 and 82, to act as a directional brake to retard rotation of medium supporting devices 10 and 12 in the unwind direction. As will be evident from Figure 3, belt 76 is attached to anchor 84 which is supported from rear panel 85 so as to prevent rotation of that belt around pulleys 80 and 82. If, for example, medium 14 is being unwound from device 10 and wound on device 12, these devices both rotate in the counterclockwise direction as seen in Figure 1, and pulleys 80 and 82 are likewise rotated in a counterclockwise direction as seen in Figure 3. Since belt 76 is relatively inextensible between support 84 and pulley 80, a substantial frictional force is exerted between that pulley and the belt. On the other hand, since spring 78 is relatively extensible, the rotation of pulley 82 produces little retarding torque. Conversely, if pulleys 80 and 82 are rotated in a clockwise direction (corresponding to winding of medium 14 from spool 12 to spool 10) belt 76 produces relatively great retarding torque on pulley 82 and relatively small retarding torque on pulley 80.

From the above description it will be evident that belt 76 acts as a more effective brake on pulleys 80 and 82 when spools 10 and 12 are rotated in the unwind direction than if rotated in the wind direction. Consequently, greater retarding torque is produced on wheels 40 and 42 when they rotate in direction corresponding to unwinding of medium 14 from the corresponding spool. This torque is balanced to only a slight degree by the action of wheels 34 and 36 for the reason that these wheels have only slight friction engagements with wheel 38 during this rotation.

The relative diameters of wheels 36, 38 and 42 are chosen so that when medium 14 tends to be wound upon spool 12, the linear velocity tended to be imparted thereto by rotation of that spool is greater than the linear velocity imparted by capstan wheel 24. Slippage accordingly takes place between wheel 36 and wheel 38 or wheel 42 and medium 14 is maintained taut between capstan wheel 24 and spool 10 and forms a tight coil on spool 10. When medium 14 is being unwound from spool 10, the medium is maintained taut in this region by the action of belt 76 which exerts increased braking effect when spool 12 rotates in the unwind direction. Similarly, the relative diameters of wheels 34, 48 and 40 are chosen to maintain medium 14 taut in the region between spool 10 and capstan wheel 24 when that spool rotates in the wind direction. As belt 76 brakes spool 10 when rotating in the unwind direction, medium 14 is maintained taut between capstan 24 and spool 10 regardless of the direction of travel thereof.

One or more of the wheels 34, 36, 38, 40 and 42 may be surfaced with felt or similar material to achieve a uniform opposition to slippage and prevent gripping.

Rotation is imparted to capstan 24 and wheel 38 by motor 30 which is selectively operable to rotate in either direction so as to enable transfer of medium 14 in either direction from between spools 10 and 12. In one arrangement, for example, this motor may be of the direct current permanent magnet type having direction of rotation determined by the polarity of the voltage applied from source 29. Switch 31, connected to control this polarity, operates as a directional controlling switch to select the direction of transfer of medium 14. An alternative method of achieving this reversible rotation is described hereafter with reference to Figures 8, 9 and 10.

Figure 6:
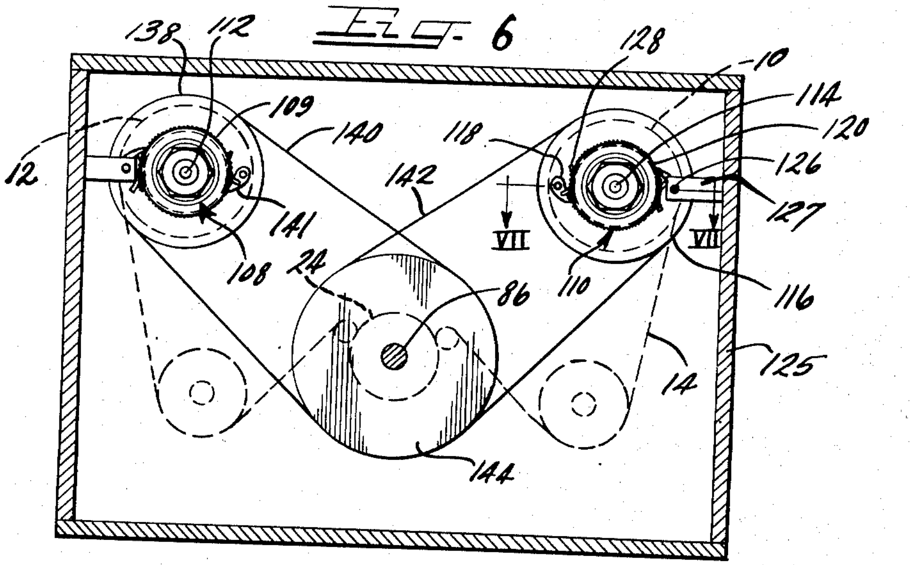
Figure 6 is a cross-sectional view along axis VI—VI, Fig. 5, showing the drive elements of the form of my invention shown in that figure.
Figure 7:
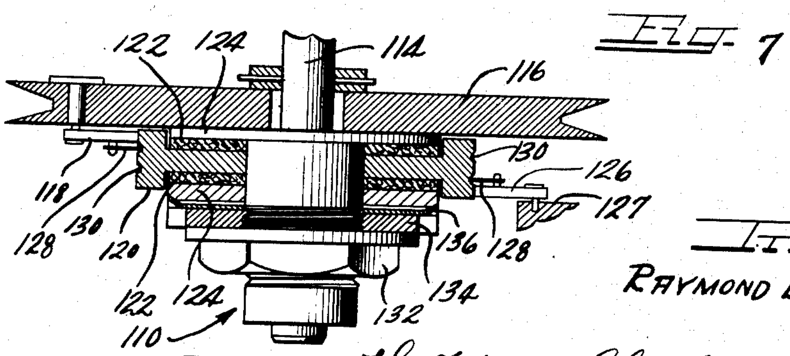
Figure 7 is a cross-sectional view through axis VII—VII, Figure 6, showing the directional slip clutch used therein.
Figure 5:
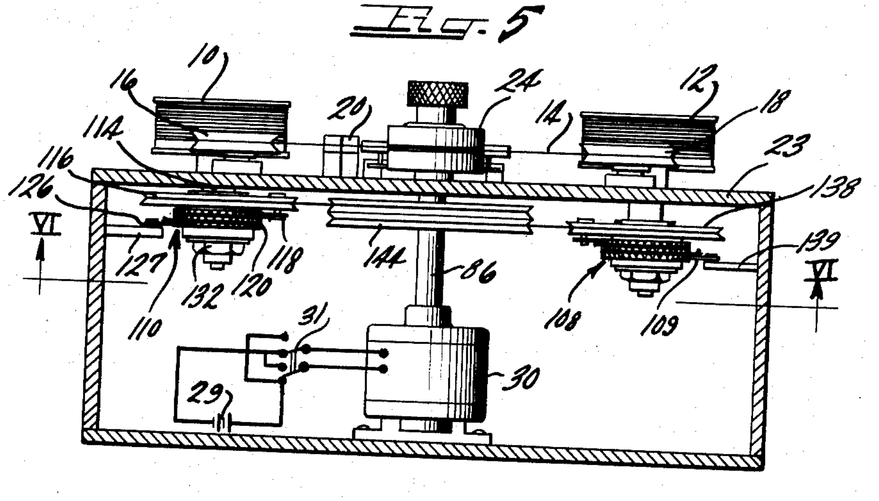
Figure 5 is a side elevational view similar to Figure 2 but showing an alternative embodiment of my invention.

An alternative embodiment of the present invention is shown in Figures 5, 6 and 7. In this embodiment selective driving and braking of spools 10 and 12 is accomplished by the use of belts 140 and 142, together with directional clutches 108 and 110. As will be evident from Figure 5, pulley 144 is attached to shaft 86 so as to rotate with capstan 24 as that shaft is driven by motor 30. This causes corresponding rotation of the pulleys 116 and 138, and driving the directional clutches shown generally at 108 and 110.

It is the function of the directional clutches shown generally at 108 and 110 to drive or retard spools 12 and 10, respectively, in accord with the direction of transfer of medium 14. The operation of these clutches will be evident from examination of the enlarged cross-sectional view of Figure 7 which shows in detail the elements of clutch 110. As will be evident from this view, pulley wheel 116 is rotatably mounted on shaft 114 which supports spool 10, Figure 5, and has mounted upon its lower surface the ratchet 118, this ratchet being disposed to engage the knurled outer periphery of disk 120. When pulley wheel 116 rotates in the counterclockwise direction (Figure 6) relative to disk 120, ratchet 118 engages the surface of that disk, thereby causing disk 120 to rotate with pulley 116. This drives shaft 114 through the frictionally engaging washers 122 which are held between disks 124, the latter being attached to shaft 114 to rotate therewith. When pulley wheel 116 rotates in the clockwise direction relative to disk 120 as seen from Figure 6, ratchet 118 slides over the knurled surface of disk 120 and no engagement is produced therebetween.

Ratchet 126 is supported on bracket 127 which is attached to the frame 125 and is likewise adapted to engage the knurled surface of disk 120. As will be evident from Figure 6, this ratchet is directed so as to engage the knurled periphery of disk 120 only when that disk tends to rotate in the clockwise direction as seen in the view of that figure. Disk 120 is accordingly held stationary against clockwise rotation as seen in Figure 6 and the frictional engagement between that wheel and shaft 114 due to washers 122 and 124 retards rotation of shaft 114 and spool 10. On the other hand, if wheel 120 rotates in the counterclockwise direction as seen in Figure 6, ratchet 126 swings clear and produces no retarding effect.

Ratchets 118 and 126 are provided with guides 128 which ride on grooves 130 of the knurled periphery of disk 120. These guides frictionally engage the grooves 130 and cause ratchets 118 and 126 to tend to swing clear of wheel 120 to a greater or lesser degree in accord with the direction of rotation thereof. This supplements the natural tendency of ratchets 118 and 126 directionally to engage and assures reliable operation of the directional clutch mechanism.

Nut 132, washer 134, and spring washer 136, are provided to adjust the axial force between washers 122 and wheel 120, thereby enabling adjustment of the clutch and braking action of unit 110. Washers 122 are preferably of a soft material such as felt to facilitate control of the frictional engagement.

Clutch 108 is like clutch 110 except that ratchet 137 is supported on bracket 139 to engage and prevent counterclockwise rotation of disk 109 and ratchet 141 is supported from pulley wheel 138 to engage and drive disk 109 in the clockwise direction.

In the operation of the embodiment of my invention shown in Figures 5 to 7, when switch 31 is adjusted to energize motor 30 to rotate shaft 86 in the counterclockwise direction as seen in Figure 6, linear velocity is imparted to medium 14 by capstan 24 in direction to transfer medium 14 from spool 12 to spool 10 as will be evident from the dashed lines of Figure 6. Simultaneously, spool 10 is driven in the wind direction through belt 142 and ratchet 118 at an angular velocity exceeding the angular velocity corresponding to the linear velocity imparted to medium 14 by capstan 24. Hence, the clutch 110 slips and medium 14 is maintained at a predetermined tension between capstan 24 and spool 10. Simultaneously, belt 140 drives pulley 138 in the counterclockwise direction as seen in Figure 6, thereby causing disengagement of ratchet 141 and permitting shaft 112 to rotate free of the action of that ratchet. Moreover, as shaft 112 rotates in the counterclockwise direction because of unwinding medium 14 from spool 12, ratchet 137 engages the knurled periphery of wheel 121, to hold that wheel stationary and retard shaft 114 so as to maintain medium 14 taut between spool 12 and capstan 24.

When switch 31 is adjusted so that motor 30 drives shaft 86 in the clockwise direction as seen in Figure 6, ratchet 141 engages and clutch 108 tends frictionally to drive spool 12 in direction to take up medium 14 at a greater rate than that corresponding to the linear velocity imparted by capstan 24. On the other hand, clutch 108 causes a frictional retardation of spool 10 because of the engagement of ratchet 126, thereby maintaining predetermined tension in medium 14 as it is unwound therefrom. Thus medium 14 is maintained taut in either direction of travel.

Figures 8, 9, and 10 are views of an alternative drive constructed in accordance with the principles of this invention. In this construction a unidirectional drive motor, 88, is supported from rotatable platform 102, the latter being supported from top panel 23 and frame 125 by shaft 104. Belt 94 extends between pulley 96 on the shaft of motor 88 and pulley 98 on shaft 86*a* which supports capstan wheel 24 and pulleys 144. Idler pulley 106 is rotatably supported from platform 102 and wheels 90 and 92 are attached to the shaft of motor 88 and the shaft 86*a* respectively. Knob 97, Figure 8, permits rotation of shaft 104 and hence platform 102.

When shaft 104 is adjusted to the position of Figures 8 and 9, motor 88 drives shaft 86*a* through belt 94 and pulleys 96 and 98, the direction of rotation of shaft 86*a* being the same as that of motor 88. When shaft 104 is rotated to the position of Figure 10, belt 94 rides on idler pulley 106 and shaft 86*a* is driven by the frictional engagement between wheels 90 and 92. In this condition, the direction of rotation of shaft 86*a* is opposite the direction of rotation of motor 88 thereby causing travel of medium 14, Figure 5, in the opposite direction.

In addition to reversing the direction of rotation of shaft 86*a* relative to the direction of rotation of motor 88, rotation of shaft 104 to convert the drive from that through pulley 94 to that between wheels 90 and 92 varies the relative speed of shaft 86*a* with respect to the speed of motor 88. Thus, by properly choosing the relative diameters of wheels 90 and 92 and pulleys 96 and 98, the medium 14 may be transferred at different velocities depending on the direction of travel. In a magnetic recording and reproducing mechanism this is of substantial advantage inasmuch as it permits more rapid rewinding of the medium 14, thereby reducing to a minimum the time necessary for the rewinding operation.

The belt 94 is made of rubber or similar elastic material to enable it to withstand the stretching associated with rotation of shaft 104. Alternatively, a yieldably biased idler pulley may be mounted to engage belt 94 and enable the platform 102 to be rotated without unduly tensioning that belt.

In a modified form of the present invention as shown in Figures 8, 9, and 10, the wheels 90 and 92 may be eliminated and a drive motor for pulley 106 attached to platform 102. In this case, belt 94 drives pulley 98 from pulley 96 in the position shown in Figures 8 and 9 and from pulley 106 in the position shown in Figure 10. Moreover, by making either or both of the motors attached to platform 102 reversible, it is possible to achieve selective rotation of capstan 24 in either direction and at two speeds in one or both directions.

While I have shown and described the drive mechanism of Figures 8, 9, and 10 as applied to the alternative form of my invention shown in Figures 5, 6, and 7, it will be evident to those skilled in the art that this drive may equally well be applied to the form shown in Figures 2 and 3.

The term "capstan" as used herein is intended to include any device about which a lengthy medium is wound to impart linear velocity thereto by rotation of the capstan, irrespective of the angle of contact between the device and the medium.

While I have shown particular embodiments of my invention, it will of course be understood that I do not wish to be limited thereto since many modifications both in the elements disclosed and their cooperative structure may be made without departing from the spirit and scope thereof. I, of course, contemplate by the appended claims to cover all such modifications and alternative constructions as fall within the true spirit and scope of my invention.

What I claim as new and desire to secure by Letters Patent of the United States is:

1. A reversible winding and reeling mechanism comprising in combination, a housing including a generally planar panel, a pair of medium supporting devices on one side of said panel, a medium wound on said devices to be transferred therebetween by rotation of the devices on axes generally at right angles to the plane of said panel, a capstan on said one side of said panel in engagement with said medium in the region between said devices, shaft means connected to said capstan and extending through said panel to the other side thereof, an electric motor in said housing and connected to said shaft means for driving said capstan at constant speed to draw said medium from one of said devices and to release said medium to wind on the other of said devices, a pair of wheels mounted within said housing one beneath each of said devices and in driving connection therewith, a driving wheel mounted generally horizontally within said housing and in driving connection with said capstan shaft means, a pair of auxiliary wheels disposed within said housing and each disposed for driving engagement with said driving wheel and one of said other wheels, the auxiliary wheels being disposed on the same side of a line connecting the axes of said drive wheel and said other wheels, means biasing each of said auxiliary wheels to wedge between said drive wheel and the respective one of said other wheels simultaneously to produce a greater or lesser torque in accord with the direction of rotation of said driving wheel, one of said auxiliary wheels being disposed to produce said greater torque in direction to wind said medium on one of said devices when said driving wheel is rotated in one direction and the other of said auxiliary wheels being disposed to produce said greater torque in the direction to wind said medium on the other of said devices when said driving wheel is rotated in the opposite direction.

2. A reversible winding and reeling mechanism comprising in combination, a housing including a generally planar panel, a pair of medium supporting devices on one side of said panel, a medium wound on said devices to be transferred therebetween by rotation of the devices on axes generally at right angles to the plane of said panel, a capstan on said one side of said panel in engagement with said medium in the region between said devices, shaft means connected to said capstan and extending through said panel to the other side thereof, an electric motor in said housing and connected to said shaft means for driving said capstan at constant speed to draw said medium from one of said devices and to release said medium to wind on the other of said devices, a pair of wheels mounted within said housing one beneath each of said devices and in driving connection therewith, a driving wheel mounted generally horizontally within said housing and in driving connection with said capstan shaft means, a pair of auxiliary wheels disposed within said housing and each disposed for driving engagement with said driving wheel and one of said other wheels, the auxiliary wheels being disposed on the same side of a line connecting the axes of said drive wheel and said other wheels, means biasing each of said auxiliary wheels to wedge between said drive wheel and the respective one of said other wheels simultaneously to produce a greater or lesser torque in accord with the direction of rotation of said driving wheel, one of said auxiliary wheels being disposed to produce said greater torque in direction to wind said medium on one of said devices when said driving wheel is rotated in one direction and the other of said auxiliary wheels being disposed to produce said greater torque in the direction to wind said medium on the other of said devices when said driving wheel is rotated in the opposite direction, and a directionally operative brake connected to each of said devices to opposite rotation thereof in the unwind direction.

3. A reversible winding and reeling mechanism comprising in combination, a housing including a generally planar panel, a pair of medium supporting devices on one side of said panel, a medium wound on said devices to be transferred therebetween by rotation of the devices on axes generally at right angles to the plane of said panel, a capstan on said one side of said panel in engagement with said medium in the region between said devices, shaft means connected to said capstan and extending through said panel to the other side thereof, an electric motor in said housing and connected to said shaft means for driving said capstan at constant speed to draw said medium from one of said devices and to release said medium to wind on the other of said devices, a pair of wheels mounted within said housing one beneath each of said devices and in driving connection therewith, a driving wheel mounted generally horizontally within said housing and in driving connection with said capstan shaft means, a pair of auxiliary wheels disposed within said housing and each disposed for driving engagement with said driving wheel and one of said other wheels, the auxiliary wheels being disposed on the same side of a line connecting the axes of said drive wheel and said other wheels, means biasing each of said auxiliary wheels to wedge between said drive wheel and the respective one of said other wheels simultaneously to produce a greater or lesser torque in accord with the direction of rotation of said driving wheel, one of said auxiliary wheels being disposed to produce said greater torque in direction to wind said medium on one of said devices when said driving wheel is rotated in one direction and the other of said auxiliary wheels being disposed to produce said greater torque in the direction to wind said medium on the other of said devices when said driving wheel is rotated in the opposite direction, and a directionally operative brake connected to each of said devices to oppose rotation thereof in the unwind direction, said brake comprising a belt passing over pulleys connected to said devices and anchored at a point on one side of said pulleys and including a resilient device on the opposite side thereof.

4. A reversible winding and reeling mechanism comprising, in combination, a housing including a panel, first and second medium supporting devices on one side of said panel and having respective first and second shaft means extending through said panel to the other side thereof, a medium wound on said devices to be transferred therebetween by rotation of the devices on said shaft means, a capstan on said one side of said panel in engagement with said medium, capstan drive means including an electric motor on the other side of the panel and within said housing for driving said capstan at constant speed in either direction to draw said medium from either one of said devices and to release said medium to wind on the other of said devices, take-up drive means between said capstan drive means and said first and second shaft means operable to tend to drive said shaft means in the winding direction at an angular velocity in excess of the angular velocity corresponding to the linear velocity imparted to said medium by said capstan, means rendering said take-up drive means inoperative to drive said shafts at the excess angular velocity in the unwind direction, slip brake means having means fixed to said housing and means interengaged with said fixed means and frictionally acting to resist rotation of said shaft means in the unwind direction, the fixed means holding said frictionally acting means against movement with said shaft means, and means rendering said slip brake means inoperative during winding movement of said shaft means, whereby in each direction of rotation of the capstan, the take-up drive means will drive the take-up medium supporting device in the winding direction and the slip brake means will act on the unwind medium supporting device to oppose rotation thereof in the unwind direction to maintain the medium in a taut condition between the capstan and the take-up and unwind devices, said slip brake means comprising a belt acting on said first and second shaft means and anchored to said housing at a point on one side of the belt between said shaft means and including a resilient device on the opposite side of the belt between the shaft means.

References Cited in the file of this patent

UNITED STATES PATENTS

| Number | Name | Date |
|---|---|---|
| 812,823 | Clay | Feb. 20, 1906 |
| 832,636 | Switzer | Oct. 9, 1906 |
| 983,602 | Caine | Feb. 7, 1911 |
| 1,845,462 | Wellman | Feb. 16, 1932 |
| 2,191,554 | Bennett | Feb. 27, 1940 |
| 2,257,172 | Klemola | Sept. 30, 1941 |
| 2,304,913 | Herzig | Dec. 15, 1942 |
| 2,325,885 | Serrurier | Aug. 3, 1943 |
| 2,528,061 | Knapp | Oct. 31, 1950 |
| 2,549,038 | Zenner | Apr. 17, 1951 |
| 2,607,544 | Zenner | Aug. 19, 1952 |
| 2,609,998 | Sear | Sept. 9, 1952 |

FOREIGN PATENTS

| Number | Country | Date |
|---|---|---|
| 418,762 | Germany | Sept. 17, 1925 |
| 313,672 | Great Britain | June 20, 1929 |
| 139,202 | Austria | Oct. 25, 1934 |